US012619850B2

(12) United States Patent
Malinowski et al.

(10) Patent No.: US 12,619,850 B2
(45) Date of Patent: May 5, 2026

(54) COMPENSATION FOR LIGHT-INDUCED CURRENT IN AN INTEGRATED CIRCUIT

(71) Applicant: NXP B.V., Eindhoven (NL)

(72) Inventors: Slawomir Rafal Malinowski, Graz (AT); Egas Carvalho Henes Neto, Gratkorn (AT); Fabien Boitard, Mouans Sartoux (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/906,620

(22) Filed: Oct. 4, 2024

(65) Prior Publication Data

US 2025/0148250 A1     May 8, 2025

(30) Foreign Application Priority Data

Nov. 2, 2023    (EP) ..................................... 23306899

(51) Int. Cl.
*G06K 19/07*          (2006.01)

(52) U.S. Cl.
CPC ..... *G06K 19/0715* (2013.01); *G06K 19/0723* (2013.01)

(58) Field of Classification Search
CPC ............... G06K 19/0715; G06K 19/00; G06K 19/0723; G06K 19/07
USPC ........................................ 235/492, 487, 375
See application file for complete search history.

(56) References Cited

U.S. PATENT DOCUMENTS

| | | |
|---|---|---|
| 4,380,741 A | 4/1983 | Mazgy |
| 4,891,606 A | 1/1990 | Clark, II et al. |
| 4,952,796 A | 8/1990 | Fruhauf et al. |

| | | | | |
|---|---|---|---|---|
| 2008/0245954 A1* | 10/2008 | Chen | ...................... | H04N 25/65 |
| | | | | 250/214 R |
| 2013/0015330 A1 | 1/2013 | Budde et al. | | |
| 2015/0022178 A1* | 1/2015 | Wen | ........................... | G05F 3/30 |
| | | | | 323/314 |
| 2016/0211911 A1* | 7/2016 | Hosking | .......... | H04B 10/07955 |
| 2018/0145002 A1* | 5/2018 | Munder | .................. | H01L 23/66 |
| 2019/0317542 A1* | 10/2019 | Brule | ......................... | G05F 3/18 |
| 2023/0266786 A1* | 8/2023 | Mouret | ..................... | G05F 3/30 |
| | | | | 323/313 |

FOREIGN PATENT DOCUMENTS

| | | | | | |
|---|---|---|---|---|---|
| EP | 1825478 B1 | * | 4/2009 | ......... | G11C 13/0014 |
| EP | 2592521 A2 | | 5/2013 | | |
| JP | 2005333624 A | * | 12/2005 | | |
| WO | WO-2017087952 A2 | * | 5/2017 | ............... | G05F 3/16 |

* cited by examiner

*Primary Examiner* — Edwyn Labaze

(57)                    ABSTRACT

A circuit for compensating for the effects of light exposure is provided. The circuit includes a first circuit and a light compensation circuit. The first circuit has an output terminal for providing a first current, wherein at least a portion of the first current is a function of a first light sensitive circuit component. The compensation circuit has a current mirror and a second light sensitive circuit component. The current mirror has an input terminal coupled to receive a second current that is mirrored from the first current, and an output terminal coupled to provide a third current responsive to the second current. The second light sensitive circuit component is configured to be similar to the first light sensitive circuit component and to compensate for a light induced current provided by the first light sensitive circuit component so that the third current is provided without a light induced current component.

18 Claims, 6 Drawing Sheets

COMPENSATION FOR LIGHT-INDUCED CURRENT IN AN INTEGRATED CIRCUIT

CROSS-REFERENCE TO RELATED APPLICATIONS

This application claims the priority under 35 U.S.C. § 119 of European Patent application no. 23306899.8, filed on Nov. 2, 2023, the contents of which are incorporated by reference herein.

BACKGROUND

Field

This disclosure relates generally to electronic circuits, and more particularly, to compensation for light-induced current in an integrated circuit.

Related Art

Radio-frequency identification (RFID) tags, commonly referred to as RFID inlays, labels or transponders, are widely used to identify an object to which the tag is attached. The most common application examples of RFID tags are retail, supply chain management, shipping services, airline luggage tracking, laundry services, etc. An RFID tag typically includes an antenna and an integrated circuit (IC) (commonly referred to herein as a "chip"). In some RFID tags, the chip is not packaged, or covered, thus exposing the chip to light. RFID tag operation can be dramatically reduced when the tag is exposed to different types of light sources, such as day light, halogen light, light emitting diode (LED) light, etc. In the semiconductor material of the unpackaged chip, light photons can create electron-hole pairs, which generate charge carriers. The photo-generated charge carriers may diffuse through the backside of the semiconductor substrate and part of them may reach pn junctions resulting in a reverse current flow (or photocurrent) which may disturb the operation of some low power circuits on the chip.

Many circuits on an IC require a constant bias voltage and/or current in order to operate properly, and the ability of a bias circuit to provide the constant bias voltage and/or current may be adversely affected by the light exposure. FIG. 1 illustrates bias circuit 100 as an example of the above-described disturbance provoked by light exposure. Bias circuit 100 includes two P-channel metal-oxide semiconductor (PMOS) transistors 102 and 103, two N-channel metal-oxide semiconductor (NMOS) transistors 104 and 105, and one N-well resistor 106. Output circuit 101 includes multiple output transistors 107 to deliver multiple bias currents to different circuits of the chip. The bias current presented in bias circuit 100 is generated through a gate-source voltage difference between transistors 104 and 105, which is applied over the N-well resistor 106. The bias current generated in bias circuit 100 is mirrored to the output circuit 101 through a current mirror formed by transistors 102 and any one of output transistors 107. The generated bias current is a resistive current labeled $I_R$.

Since N-well resistor 106 is formed with N-well material in a P-substrate, a parasitic pn junction device created by the N-well and P-substrate semiconductor material is present in resistor 106. This means when the N-well resistor is exposed to light, a parallel current at N-well resistor 106 may occur due to the reverse current flow across the pn junction. This parallel current at N-well resistor 106 is a light induced photocurrent, labeled $I_L$, and once generated by a source of light will be added to current $I_R$, resulting in output currents at 107 with the value $I_R$ plus $I_L$ labeled $I_R+I_L$ in FIG. 1.

The additional current $I_L$ flowing from the output devices 107 to different circuits of the chip may increase the overall current consumption of the chip and disturb the operation of circuits receiving current from transistors 107, which would also receive light induced current $I_L$.

SUMMARY

In accordance with a first aspect of the present disclosure, a circuit implemented on an integrated circuit is provided, the circuit comprising: a first circuit having a first light sensitive circuit component, and an output terminal for providing a first current, wherein at least a portion of the first current is a function of the first light sensitive circuit component; and a compensation circuit having a current mirror and a second light sensitive circuit component, the current mirror having an input terminal coupled to receive a second current that is mirrored from the first current, and an output terminal coupled to provide a third current in response to the second current, the second light sensitive circuit component configured to match the first light sensitive circuit component and to compensate for a light induced current provided by the first light sensitive circuit component, thereby providing the third current without a light induced current component due to the first light sensitive circuit component.

In one or more embodiments, the first and second light sensitive components each comprise an N-well resistor.

In one or more embodiments, the N-well resistor is formed in a P-substrate, wherein the P-substrate is grounded.

In one or more embodiments, one or both of an area and resistance value of the second light sensitive component is proportional to one or both of an area and resistance value of the first light sensitive component.

In one or more embodiments, the current mirror of the compensation circuit comprises: a first transistor having a first current electrode and a control electrode coupled to receive the first current, and a second current electrode coupled to ground; and a second transistor having a first current electrode, a control electrode coupled to the control electrode of the first transistor, and a second current electrode coupled to ground.

In one or more embodiments, the second light sensitive circuit component has a first terminal and a second terminal, and wherein both the first and second terminals are coupled to both the control electrodes of the first and second transistors.

In one or more embodiments, the circuit further comprises: a third transistor having a first current electrode coupled to a power supply voltage, a control electrode coupled to receive a first bias voltage from the first circuit, and a second current electrode coupled to the first current electrode of the first transistor; and a fourth transistor having a first current electrode coupled to the power supply voltage, and a control electrode and a second current electrode both coupled to the first current electrode of the second transistor.

In one or more embodiments, the circuit further comprises one or more further circuits coupled to the first current electrode and the control electrode of the fourth transistor to receive a bias voltage generated by the first circuit.

In one or more embodiments, the first circuit comprises: a first transistor having a first current electrode, a second current electrode coupled to a first terminal of the first light sensitive component, and a control electrode; a second transistor having a first current electrode, a second current electrode coupled to ground, a control electrode and a second current electrode both coupled to the control electrode of the first transistor; and a third transistor having a first current electrode coupled to receive a power supply voltage, a control electrode and a second current electrode both coupled to the first current electrode of the first transistor for providing the first current that is mirrored to form the second current.

In one or more embodiments, the first circuit is implemented in an unpackaged integrated circuit for use in a radio frequency identification tag.

In accordance with a second aspect of the present disclosure, a circuit to compensate for light induced current in an unpackaged integrated circuit is provided, the circuit comprising: a first circuit having a first light sensitive N-well resistor, and an output terminal for providing a first current, wherein at least a portion of the first current is a function of the first light sensitive N-well resistor; and a compensation circuit having a current mirror and a second light sensitive N-well resistor, the current mirror having an input terminal coupled to receive a second current that is mirrored from the first current, and an output terminal coupled to provide a third current in response to the second current, the second light sensitive N-well resistor configured to match the first light sensitive N-well resistor and to compensate for a light induced current component provided by the first light sensitive N-well resistor, wherein the third current is provided without a light generated current component.

In one or more embodiments, one or both of an area and resistance value of the light sensitive N-well resistor is proportional to one or both an area and resistance value of the first light sensitive N-well resistor.

In one or more embodiments, the current mirror of the compensation circuit comprises: a first transistor having a first current electrode and a control electrode coupled to receive the first current, and a second current electrode coupled to ground; and a second transistor having a first current electrode, a control electrode coupled to the control electrode of the first transistor, and a second current electrode coupled to ground.

In one or more embodiments, the second light sensitive N-well resistor has a first terminal and a second terminal, and wherein both the first and second terminals are coupled to both the control electrodes of the first and second transistors.

In one or more embodiments, the circuit is implemented in an unpackaged integrated circuit that is exposed to light during use.

In accordance with a third aspect of the present disclosure, a bias circuit to compensate for light induced current in an unpackaged integrated circuit is provided, the bias circuit comprising: a first circuit comprising: a first transistor having a first current electrode coupled to a power supply voltage, and a second current electrode and a control electrode coupled together; a second transistor having a first current electrode coupled to a power supply voltage, a second current electrode, and a control electrode coupled to both the control electrode and the second current electrode of the first transistor, and a second current electrode; and a third transistor having a first current electrode coupled to the second current electrode of the first transistor, a control electrode, and a second current electrode; a fourth transistor having a first current electrode and a control electrode coupled to both the second current electrode of the second transistor and to the control electrode of the third transistor and a second current electrode coupled to a ground terminal; a light sensitive component having a first terminal coupled to the second terminal of the third transistor, and a second terminal coupled to ground; a compensation circuit comprising: a fifth transistor having a first current electrode coupled to the power supply terminal, a control electrode coupled to the current electrode of the first transistor, and a second current electrode; a sixth transistor having a first current electrode coupled to the power supply terminal, and a second current electrode and a control electrode coupled together; a seventh transistor having a first current electrode and a control electrode coupled to the second current electrode of the fifth transistor, and a second current electrode coupled to the ground; and an eighth transistor having a first current electrode coupled to the second current electrode of the sixth transistor, a control electrode coupled to the second current electrode of the fifth transistor, and a second current electrode coupled to the ground terminal; and a second light sensitive component having first and second terminals both coupled to the second current electrode of the fifth transistor.

In one or more embodiments, the first and second light sensitive components each comprise an N-well resistor.

In one or more embodiments, the N-well resistors of the first and second light sensitive components are formed in a P-substrate, wherein the P-substrate is grounded.

In one or more embodiments, one or both of an area and resistance value of the second light sensitive component is proportional to one or both an area and resistance value of the first light sensitive component.

In one or more embodiments, the first circuit is implemented in an unpackaged integrated circuit of a radio frequency identification tag.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
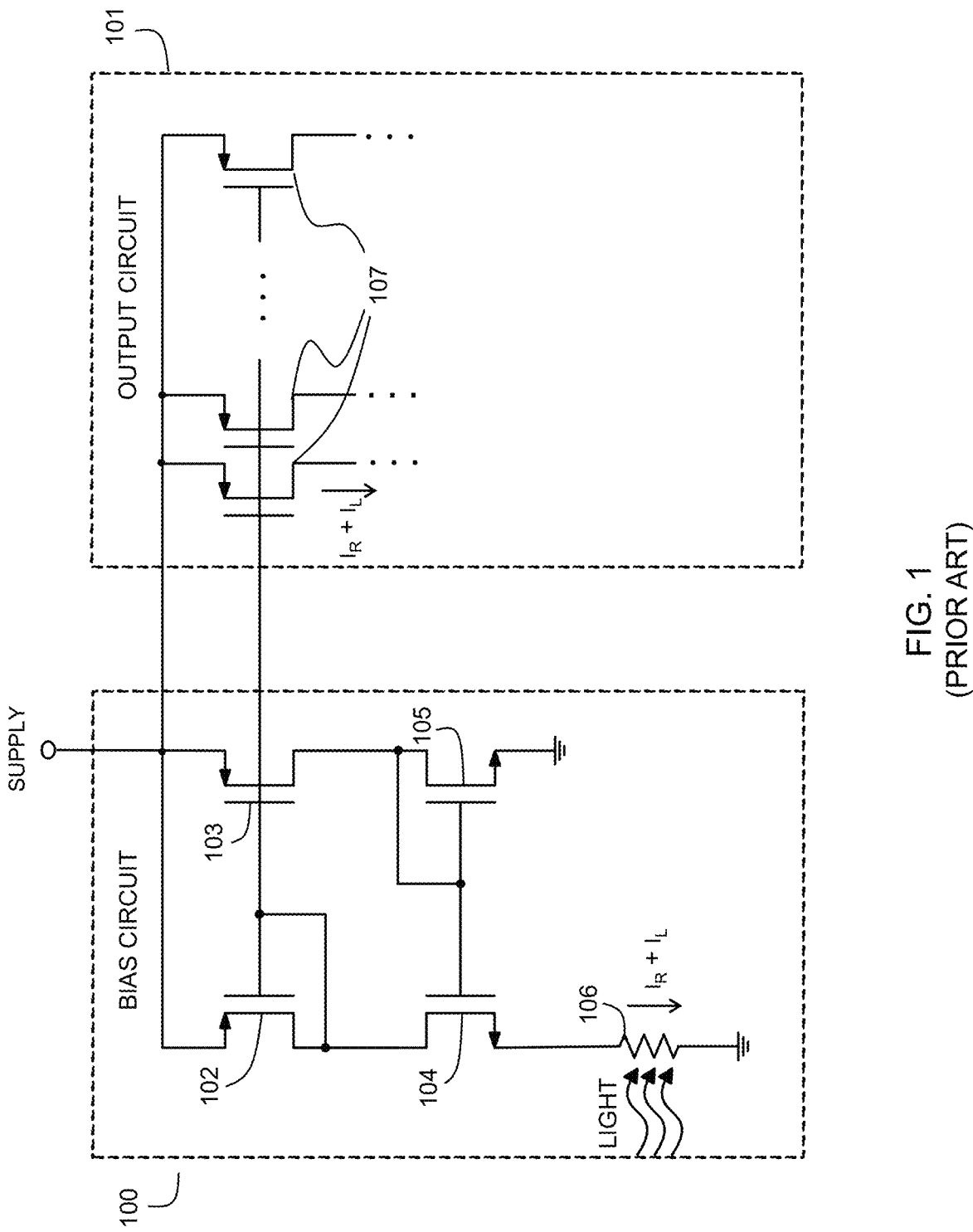
FIG. 1 illustrates a bias circuit according to the prior art.

Generally, there is provided, an IC having a bias circuit that includes a light sensitive circuit component, the light sensitive device adds an undesired current component to the output when the IC is exposed to light. A compensation circuit is inserted between the bias circuit and the output. The compensation circuit has another light sensitive circuit component and a current mirror that functions to remove the undesired current component to assure proper operation of the bias circuit when exposed to light. The bias circuit generates a bias current for different circuits of the chip minus the light induced current component, thus ensuring an accurate bias current is provided throughout the integrated circuit and reducing current flow that can contribute to increased power consumption.

In accordance with an embodiment, there is provided, a circuit implemented on an integrated circuit, the circuit including: a first circuit having a first light sensitive circuit component, and an output terminal for providing a first current, wherein at least a portion of the first current is a function of the first light sensitive circuit component; and a compensation circuit having a current mirror and a second light sensitive circuit component, the current mirror having an input terminal coupled to receive a second current that is mirrored from the first current, and an output terminal coupled to provide a third current in response to the second current, the second light sensitive circuit component configured to match the first light sensitive circuit component and to compensate for a light induced current provided by the first light sensitive circuit component, thereby providing the third current without a light induced current component due to the first light sensitive circuit component. The first and second light sensitive components may each include an N-well resistor. The N-well resistor may be formed in a P-substrate, and wherein the P-substrate may be grounded. One or both of an area and resistance value of the second light sensitive component may be proportional to one or both of an area and resistance value of the first light sensitive component. The current mirror of the compensation circuit may include: a first transistor having a first current electrode and a control electrode coupled to receive the first current, and a second current electrode coupled to ground; and a second transistor having a first current electrode, a control electrode coupled to the control electrode of the first transistor, and a second current electrode coupled to ground. The second light sensitive circuit component may have a first terminal and a second terminal, and wherein both the first and second terminals may be coupled to both the control electrodes of the first and second transistors. The circuit may further include: a third transistor having a first current electrode coupled to a power supply voltage, a control electrode coupled to receive a first bias voltage from the first circuit, and a second current electrode coupled to the first current electrode of the first transistor; and a fourth transistor having a first current electrode coupled to the power supply voltage, and a control electrode and a second current electrode both coupled to the first current electrode of the second transistor. The circuit may further include one or more further circuits coupled to the first current electrode and the control electrode of the fourth transistor to receive a bias voltage generated by the first circuit. The first circuit may include: a first transistor having a first current electrode, a second current electrode coupled to a first terminal of the first light sensitive component, and a control electrode; a second transistor having a first current electrode, a second current electrode coupled to ground, a control electrode and a second current electrode both coupled to the control electrode of the first transistor; and a third transistor having a first current electrode coupled to receive a power supply voltage, a control electrode and a second current electrode both coupled to the first current electrode of the first transistor for providing the first current that is mirrored to form the second current. The first circuit may be implemented in an unpackaged integrated circuit for use in a radio frequency identification tag.

In another embodiment, there is provided, a circuit to compensate for light induced current in an unpackaged integrated circuit, the circuit including: a first circuit having a first light sensitive N-well resistor, and an output terminal for providing a first current, wherein at least a portion of the first current is a function of the first light sensitive N-well resistor; and a compensation circuit having a current mirror and a second light sensitive N-well resistor, the current mirror having an input terminal coupled to receive a second current that is mirrored from the first current, and an output terminal coupled to provide a third current in response to the second current, the second light sensitive N-well resistor configured to match the first light sensitive N-well resistor and to compensate for a light induced current component provided by the first light sensitive N-well resistor, wherein the third current is provided without a light generated current component. One or both of an area and resistance value of the light sensitive N-well resistor may be proportional to one or both an area and resistance value of the first light sensitive N-well resistor. The current mirror of the compensation circuit may include: a first transistor having a first current electrode and a control electrode coupled to receive the first current, and a second current electrode coupled to ground; and a second transistor having a first current electrode, a control electrode coupled to the control electrode of the first transistor, and a second current electrode coupled to ground. The second light sensitive N-well resistor may have a first terminal and a second terminal, and wherein both the first and second terminals may be coupled to both the control electrodes of the first and second transistors. The circuit may be implemented in an unpackaged integrated circuit that is exposed to light during use.

In yet another embodiment, there is provided, a bias circuit to compensate for light induced current in an unpackaged integrated circuit, the bias circuit including: a first circuit comprising: a first transistor having a first current electrode coupled to a power supply voltage, and a second current electrode and a control electrode coupled together; a second transistor having a first current electrode coupled to a power supply voltage, a second current electrode, and a control electrode coupled to both the control electrode and the second current electrode of the first transistor, and a second current electrode; and a third transistor having a first current electrode coupled to the second current electrode of the first transistor, a control electrode, and a second current electrode; a fourth transistor having a first current electrode and a control electrode coupled to both the second current electrode of the second transistor and to the control electrode of the third transistor, and a second current electrode coupled to a ground terminal; a light sensitive component having a first terminal coupled to the second terminal of the third transistor, and a second terminal coupled to ground; a compensation circuit including: a fifth transistor having a first current electrode coupled to the power supply terminal, a control electrode coupled to the current electrode of the first transistor, and a second current electrode; a sixth transistor having a first current electrode coupled to the power supply terminal, and a second current electrode and a control electrode coupled together; a seventh transistor having a first current electrode and a control electrode coupled to the second current electrode of the fifth transistor, and a second current electrode coupled to the ground; and an eighth transistor having a first current electrode coupled to the second current electrode of the sixth transistor, a control electrode coupled to the second current electrode of the fifth transistor, and a second current electrode coupled to the ground terminal; and a second light sensitive component having first and second terminals both coupled to the second current electrode of the fifth transistor. The first and second light sensitive components may each include an N-well resistor. The N-well resistors of the first and second light sensitive components may be formed in a P-substrate, and wherein the P-substrate is grounded. One or both of an area and resistance value of the second light sensitive component may be proportional to one or both an area and resistance value of the first light sensitive component. The first circuit may be implemented in an unpackaged integrated circuit of a radio frequency identification tag.

Figure 2:
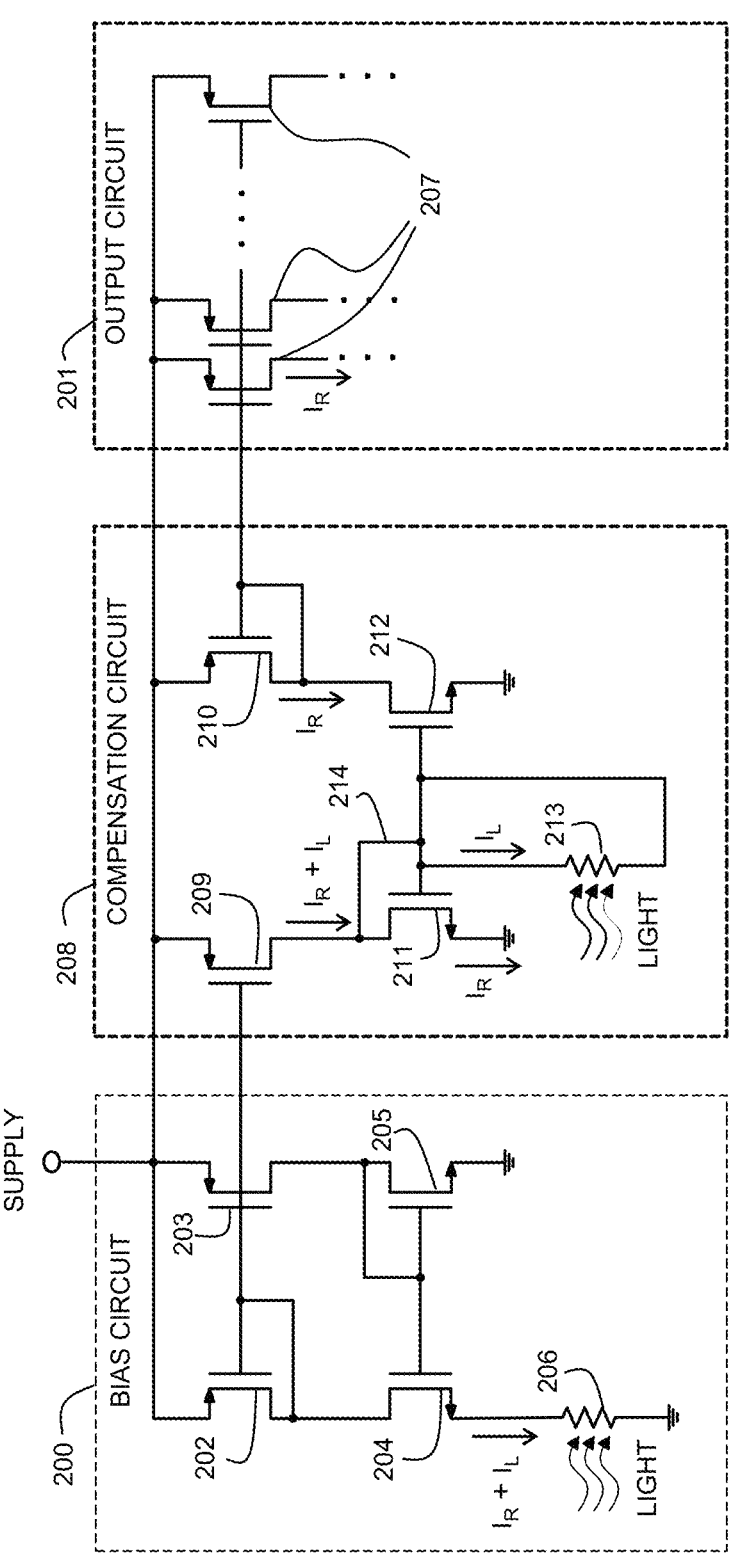
FIG. 2 illustrates a bias circuit with a compensation circuit according to an embodiment.

FIG. 2 illustrates bias circuit 200 and compensation circuit 208 according to an embodiment. Bias circuit 200 includes two PMOS transistors 202 and 203, two NMOS transistors 204 and 205, and one N-well resistor 206. In bias circuit 200, PMOS transistor 202 has a source connected to a power supply terminal labeled SUPPLY, and a gate and a drain connected together. PMOS transistor 203 has a source connected to power supply terminal SUPPLY, a gate connected to the gate and drain of transistor 202, and a drain. NMOS transistor 204 has a drain connected to the drain of PMOS transistor 202, a gate, and a source. NMOS transistor 205 has a gate and a drain connected to the drain of PMOS transistor 203, and a source connected to a ground terminal. Light sensitive N-well resistor 206 has a first terminal connected to the source of NMOS transistor 204, and a second terminal connected to the ground terminal. N-well resistors are good for some circuit implementations where large values of resistance and/or desired temperature coefficient of bias are needed.

Compensation circuit 208 includes PMOS transistors 209 and 210, NMOS transistors 211 and 212, and light sensitive N-well resistor 213. In compensation circuit 208, PMOS transistor 209 has a source connected to the power supply terminal SUPPLY, a gate connected to the gate and drain of PMOS transistor 202, and a drain at node 214. PMOS transistor 210 has a source connected to the power supply terminal SUPPLY, and a gate and drain connected together. NMOS transistor 211 has a gate and drain connected to the drain of PMOS transistor 209 at node 214, and a drain connected to a ground terminal. NMOS transistor 212 has a drain connected to the gate and drain of PMOS transistor 210, a gate connected to the gate and drain of NMOS transistor 211 at node 214, and a source connected to the ground terminal. Light sensitive N-well resistor 213 has a first terminal and a second terminal both connected to the gate and drain of NMOS transistor 211. The output circuit 201 includes multiple output transistors 207 to deliver multiple bias currents to different circuits of the chip. Each PMOS transistor 207 has a source connected to the power supply terminal SUPPLY, a gate connected to the gate and drain of PMOS transistor 210, and a drain connected to a circuit on the IC that requires a bias current labeled IR.

Light sensitive N-well resistors are formed on an IC to be very closely matched to each other. In one embodiment, N-well resistor 206 may be formed using multiple N-well resistors connected in series and/or in parallel so that an area, surface dimensions, and resistance value of N-well resistor 206 is proportionally larger than an area and resistance value of N-well resistor 213. This provides the benefit of reduced area for implementing N-well resistor 213. As mentioned above, N-well resistors are good for circuit implementations where large values of resistance are needed, and/or a desired temperature coefficient of bias is needed.

The bias current presented in bias circuit 200 is generated through a gate-source voltage difference between the transistors 204 and 205, which is applied over the N-well resistor 206. Because N-well resistor 206 is formed with N-well material in a P-substrate, a parasitic pn junction device created by the N-well and P-substrate materials is present in resistor 206. This means that when N-well resistor 206 is exposed to light, a parallel current at N-well resistor 206 may occur due to a reverse current flow of the pn junction. This parallel current at N-well resistor 206 is a photocurrent, labeled $I_L$, and once generated by a source of light will be added to current $I_R$, resulting in output currents at PMOS transistors 207 with the value $I_R$ plus $I_L$ labeled $I_R+I_L$ in FIG. 2. Bias circuit 200 functions similarly to bias circuit 100 in FIG. 1, except that compensation circuit 208 is added to bias circuit 200 to remove and prevent the photocurrent component $I_L$ from being presented in the output currents of transistors 207. The bias current $I_R$ presented in bias circuit 200 is generated through the gate-source voltage difference between transistors 204 and 205, which is applied over light sensitive N-well resistor 206. The bias current $I_R$ generated in bias circuit 200 is mirrored to compensation circuit 208 through a current mirror formed by PMOS transistors 202 and 209. Bias current $I_R$ flowing in PMOS transistor 209 is mirrored to PMOS transistor 210 through an NMOS mirror formed by NMOS transistors 211 and 212. Finally, bias current $I_R$ at PMOS transistor 210 is mirrored to output PMOS transistors 207 to provide bias current $I_R$ to different circuits of the chip.

Once the circuit of FIG. 2 is exposed to the light, the total current of bias circuit 200 is increased with the addition of the photocurrent $I_L$ from the light sensitive N-well resistor as described above due to the reverse current flow of the pn junction and shown in FIG. 2. This results in the bias current flowing through PMOS transistor 209 being expressed by the term $I_R+I_L$, where $I_R$ is the resistive current and $I_L$ is the photocurrent from N-well resistor 206 when the chip is exposed to light. This means current $I_R+I_L$ flows from the PMOS transistor 209 into the node 214. N-well resistor 213 has first and second terminals that are both connected to node 214 and is similar to N-well resistor 206. in other words, N-well resistor 213 also has a parasitic pn junction that creates a reverse current between node 214 and a grounded P-substrate when the chip is exposed to light. Since the N-well resistors 206 and 213 have the same formation, the light induced current component $I_L$ at node 214, coming from transistor 209 will flow through the N-well resistor 213, while the bias current component $I_R$ at node 214, coming from transistor 209, will flow through NMOS transistor 211. As a consequence of this, a bias current mirrored from transistor 211 to transistor 212 is bias current $I_R$, that is, without the photocurrent component $I_L$. This means, bias current $I_R$ delivered by the output transistors 207 only includes bias current $I_R$, and no light induced current $I_L$ should be detected at output transistors 207.

When bias circuit 200 with compensation circuit 208 is operated with no light exposure (dark environment), compensation circuit 208 is transparent, that is, compensation circuit 208 does not interfere in the value of $I_R$ of the output devices 207. This happens because light sensitive N-well resistor 213 is shorted with both terminals connected to the node 214 and no light induced current is generated by the pn junction.

In order to compensate for the light induced current of N-well resistor 206 as discussed above, a closely matched light sensitive N-well resistor 213 should be provided. To provide a current to cancel the light induced current of N-well resistor 206, N-well resistor 213 should be exposed to the exact same lighting conditions, and provide the same behavior (same temperature gradient, same environment). A physical implementation and surrounding of N-well resistor 206 and N-well resistor 213 should be the same for proper operation of compensation circuit 208. As presented in FIG. 2, both N-well resistors 206 and 213 consume important area of the chip.

Figure 3:
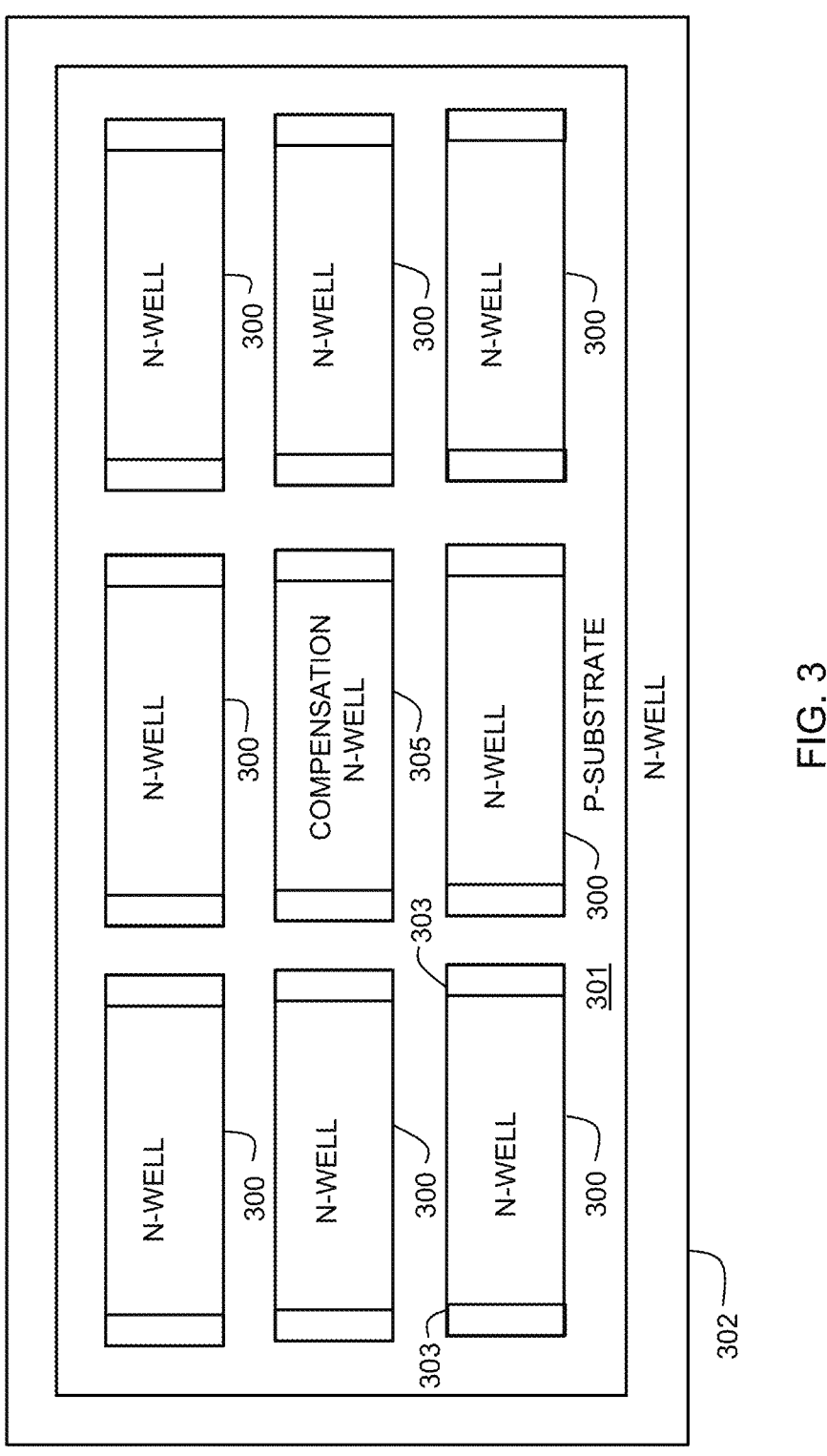
FIG. 3 illustrates a top down view of an example layout of the light sensitive N-well resistors of both the bias circuit and the compensation circuit of FIG. 2.

FIG. 3 illustrates a top down view of a simple layout of light sensitive N-well resistors that can be used for N-well resistors 206 and 213 of FIG. 2. In FIG. 3 there are eight N-well resistors 300 surrounding one compensation N-well resistor 305 in a P-substrate 301 of an IC that includes bias circuit 200 and compensation circuit 208. Each of the N-well resistors 300 and 305 includes a contact 303 for connection with circuit elements as shown in FIG. 2. Each of the eight N-well resistors 300 are as closely matched to N-well resistor 305 as practical. In one embodiment, the eight N-well resistors 300 are connected in series and/or in parallel (connections not shown in FIG. 3). Therefore, the ratio of the light sensitive N-well resistor 206 over the light sensitive N-well resistor 213, in terms of both area and resistance value, is eight (8). With this physical implementation, each N-well 300 and 305, has the same surrounding, and should generate relatively closely matching photocurrents when a light source is placed on the top or bottom of the chip. Furthermore, N-well ring 302 is used to collect photons if a light source is placed on an edge of the chip. The illustrated physical implementation of FIG. 3 also brings another advantage since the area overhead of compensation N-well resistor 301 is minimized. However, in this case, the ratio of the current mirror formed by the PMOS transistors 202 and 209 in FIG. 2 should be chosen to properly fit the chosen ratio of the N-well resistors 206 and 213.

Figure 4:
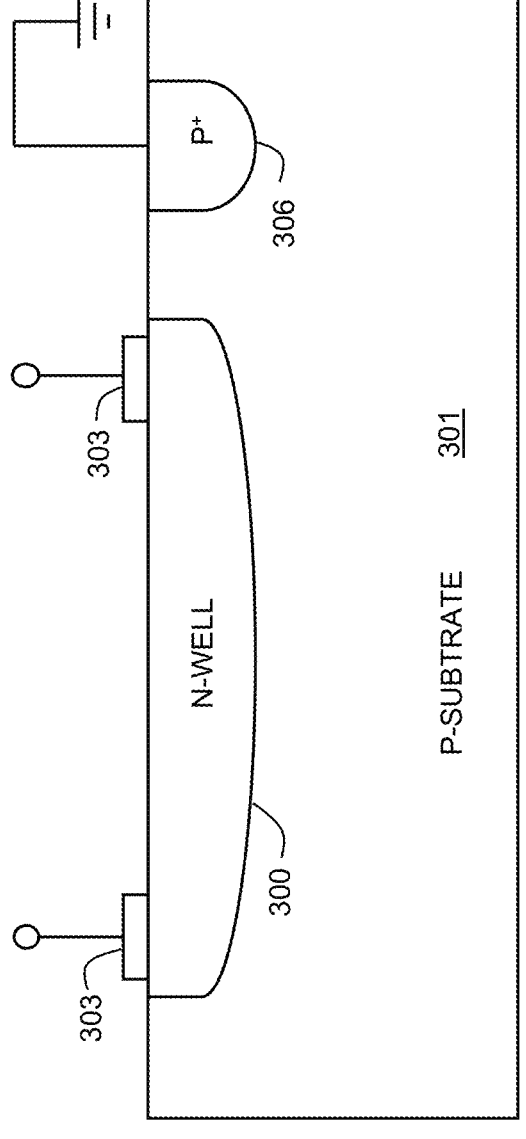
FIG. 4 illustrates a cross-sectional view of one N-well resistor according to an embodiment.

FIG. 4 illustrates a simple cross-sectional view of one of N-well resistors 300 and 305 of FIG. 3 according to an embodiment. In FIG. 4, an N-well 300 is formed in P-substrate 301. In one embodiment, P-substrate 301 has a $P^-$ conductivity type. A $P^+$ region formed in P-substrate 301 is used to provide a connection to ground for P-substrate 301. The N-well is the resistive material of light sensitive N-well resistors 206 and 213 in FIG. 2. Contacts 303 are formed on a surface of N-well 300 for making a circuit connection with the other components of bias circuit 200 and compensation circuit 208. Contacts 303 may be formed from a metal or other type of conductive material. The juncture between N-well 300 and P-substrate 301 forms a parasitic pn junction that can create a reverse current to ground when the chip is exposed to light. N-well 305 for use in the compensation circuit 208 is formed to closely match dimensions and other physical and electrical characteristics of N-well 300.

Figure 5:
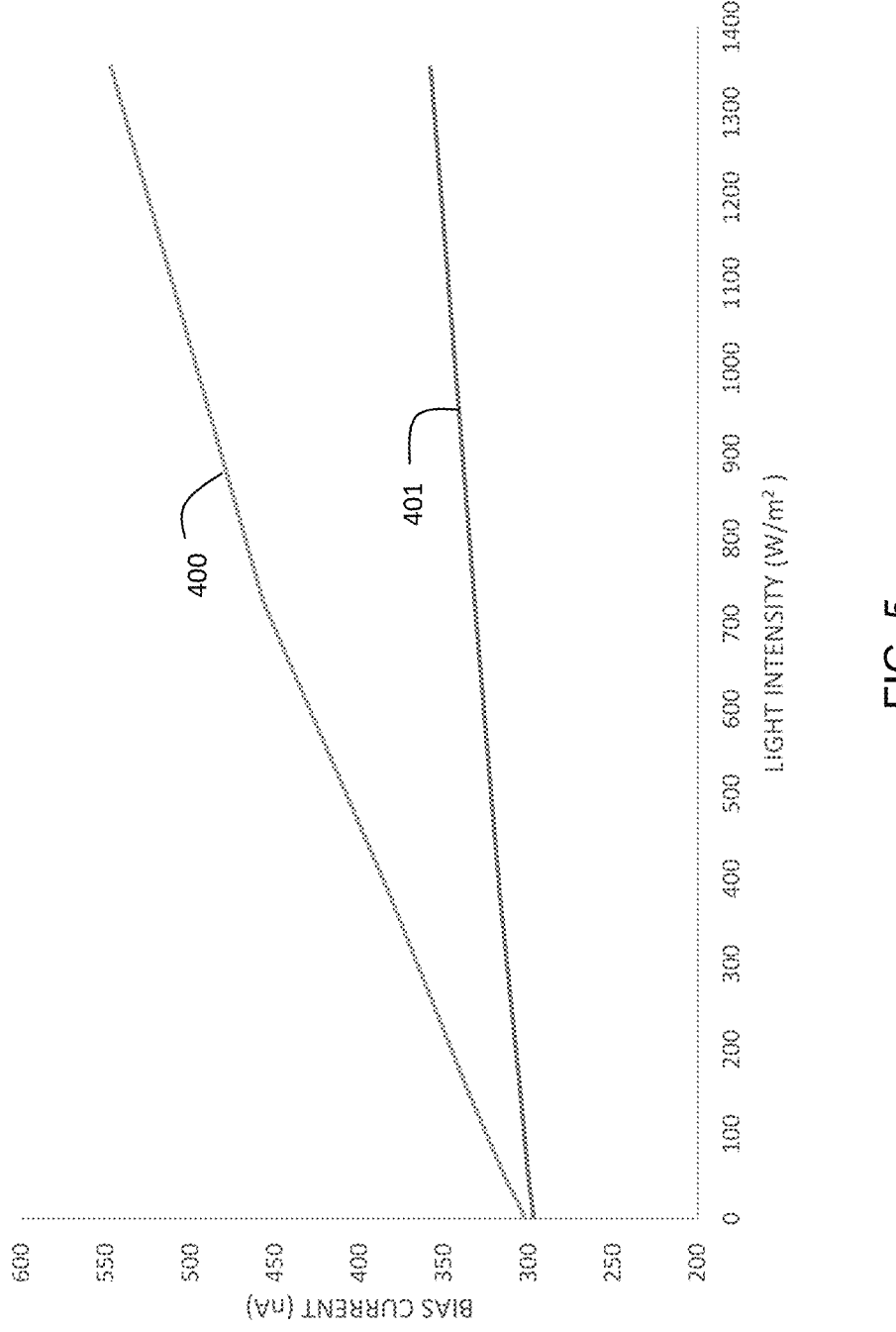
FIG. 5 illustrates a graph of bias current versus light intensity for the bias circuits of FIG. 1 and FIG. 2.

FIG. 5 illustrates a graph of bias current versus light intensity for the bias circuits of FIG. 1 and FIG. 2. FIG. 5 shows the effectiveness of bias circuit 200 with compensation circuit 208 as compared to bias circuit 100 without compensation for light induced current. To make the graph, a chip having the circuits was exposed to a halogen light source and the power intensity of the light source was swept from 0 to 1350 watts per meter squared ($W/m^2$). For both bias circuits 100 and 200, the expected value of bias current is 300 nanoamperes (nA) with no light influence (dark). In FIG. 5, the results of bias circuit 100 without light compensation are expressed with curve 400, while the results of bias circuit 200 with light compensation circuit 208 are expressed with curve 401. At the maximum swept light intensity, bias circuit 100 without light compensation presented an absolute value of the bias current equal to about 550 nA, representing a variation of 83.3% with respect to the original value of 300 nA. At the same maximum light intensity condition, bias circuit 200 with light compensation circuit 208 presented an absolute value of the bias current equal to 360 nA, representing a variation of 20% with respect to the original value of 300 nA. In other words, bias circuit 200 with light compensation circuit 208 presents 4.16 less variation with respect to the original value when compared with the circuit without compensation at the maximum swept light intensity. Note that the results may be different for different circuit implementations.

Figure 6:
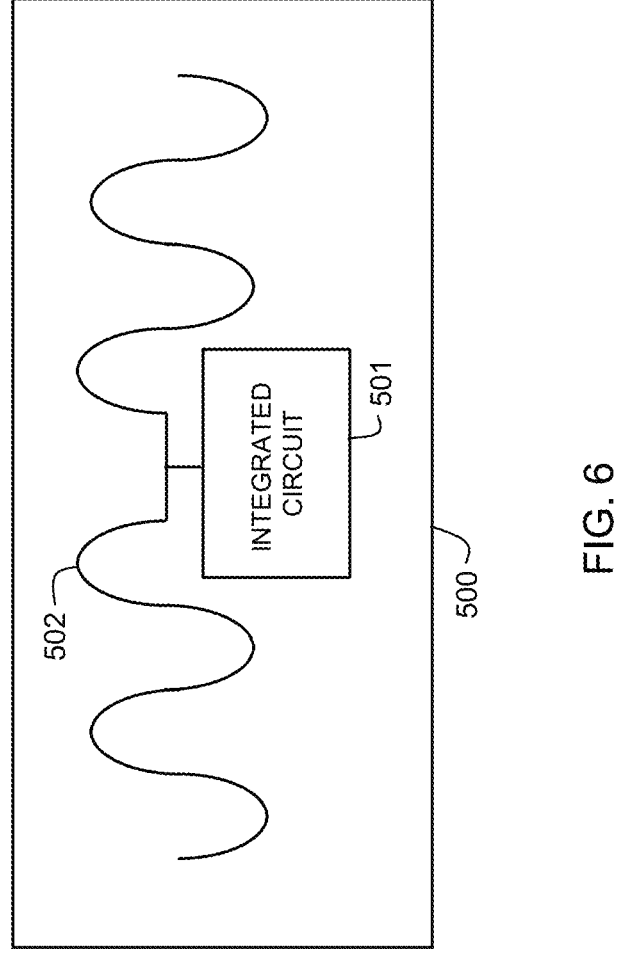
FIG. 6 illustrates a RFID tag according to an embodiment.

FIG. 6 illustrates radio frequency identification (RFID) tag 500 according to an embodiment. RFID tag 500 includes IC 501 (chip) and antenna 502 connected to an antenna connection of IC 501. IC 501 includes RFID tag 500 may include a transponder for communicating wirelessly with a reader. There are various frequency ranges that can be used depending on the application. RFID tag 500 may be passive and receive power to operate wirelessly from a reader device (not shown) via antenna 502, or may be active and have its own power source. There are also various ways RFID tag 500 may be implemented. In one embodiment, RFID tag 500 is implemented on a flexible tape with an adhesive on one side to allow RFID tag 500 to be attached to an object to be identified. In a low cost embodiment, IC 501 may be unpackaged, with the consequence that it may be exposed to various different light types such as day light, halogen light, LED light, etc. The use of bias circuit 200 with light compensation circuit 208 ensures a constant controlled bias current is provided whether the chip in RFID tag 500 is exposed to light or not.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

The invention claimed is:

1. A circuit implemented on an integrated circuit, the circuit comprising:

a first circuit having a first light sensitive circuit component, and an output terminal for providing a first current, wherein at least a portion of the first current is a function of the first light sensitive circuit component; and a compensation circuit having a current mirror and a second light sensitive circuit component, the current mirror having:

an input terminal coupled to receive a second current that is mirrored from the first current;

a first transistor having a first current electrode and a control electrode coupled to receive the first current, and a second current electrode coupled to ground; and a second transistor having a first current electrode, a control electrode coupled to the control electrode of the first transistor, and a second current electrode coupled to ground; and an output terminal coupled to provide a third current in response to the second current; and the second light sensitive circuit component configured to match the first light sensitive circuit component and to compensate for a light induced current provided by the first light sensitive circuit component, thereby providing the third current without a light induced current component due to the first light sensitive circuit component.

2. The circuit of claim 1, wherein the first and second light sensitive components each comprise an N-well resistor.

3. The circuit of claim 2, wherein the N-well resistor is formed in a P-substrate, and wherein the P-substrate is grounded.

4. The circuit of claim 1, wherein one or both of an area and resistance value of the second light sensitive circuit component is proportional to one or both of an area and resistance value of the first light sensitive circuit component.

5. The circuit of claim 1, wherein the second light sensitive circuit component has a first terminal and a second terminal, and wherein both the first and second terminals are coupled to both the control electrodes of the first and second transistors.

6. The circuit of claim 5, further comprising:

a third transistor having a first current electrode coupled to a power supply voltage, a control electrode coupled to receive a first bias voltage from the first circuit, and a second current electrode coupled to the first current electrode of the first transistor; and a fourth transistor having a first current electrode coupled to the power supply voltage, and a control electrode and a second current electrode both coupled to the first current electrode of the second transistor.

7. The circuit of claim 6, further comprising one or more further circuits coupled to the first current electrode and the control electrode of the fourth transistor to receive a bias voltage generated by the first circuit.

8. The circuit of claim 1, wherein the first circuit comprises:

a third transistor having a first current electrode, a second current electrode coupled to a first terminal of the first light sensitive component, and a control electrode;

a fourth transistor having a first current electrode, a second current electrode coupled to ground, a control electrode and a second current electrode both coupled to the control electrode of the third transistor; and a fifth transistor having a first current electrode coupled to receive a power supply voltage, a control electrode and a second current electrode both coupled to the first current electrode of the third transistor for providing the first current that is mirrored to form the second current.

9. The circuit of claim 1, wherein the first circuit is implemented in an unpackaged integrated circuit for use in a radio frequency identification tag.

10. An unpackaged integrated circuit comprising:

a first circuit having a first light sensitive N-well resistor that is exposed to light during operation of the unpackaged integrated circuit, and an output terminal for providing a first current, wherein at least a portion of the first current is a function of an exposure of the first light sensitive N-well resistor to light; and a compensation circuit having a current mirror and a second light sensitive N-well resistor, the current mirror having an input terminal coupled to receive a second current that is mirrored from the first current, and an output terminal coupled to provide a third current in response to the second current, the second light sensitive N-well resistor configured to match the first light sensitive N-well resistor and to compensate for a light induced current component provided by the first light sensitive N-well resistor from the exposure to light, wherein the third current is provided without a light generated current component.

11. The circuit of claim 10, wherein one or both of an area and resistance value of the light sensitive N-well resistor is proportional to one or both an area and resistance value of the first light sensitive N-well resistor.

12. A circuit to compensate for light induced current in an unpackaged integrated circuit, the circuit comprising:

a first circuit having a first light sensitive N-well resistor, and an output terminal for providing a first current, wherein at least a portion of the first current is a function of the first light sensitive N-well resistor;

a compensation circuit having a current mirror and a second light sensitive N-well resistor, the current mirror having an input terminal coupled to receive a second current that is mirrored from the first current, and an output terminal coupled to provide a third current in response to the second current, the second light sensitive N-well resistor configured to match the first light sensitive N-well resistor and to compensate for a light induced current component provided by the first light sensitive N-well resistor, wherein the third current is provided without a light generated current component; and the current mirror of the compensation circuit further comprising:

a first transistor having a first current electrode and a control electrode coupled to receive the first current, and a second current electrode coupled to ground; and a second transistor having a first current electrode, a control electrode coupled to the control electrode of the first transistor, and a second current electrode coupled to ground.

13. The circuit of claim 12, wherein the second light sensitive N-well resistor has a first terminal and a second terminal, and wherein both the first and second terminals are coupled to both the control electrodes of the first and second transistors.

14. A bias circuit to compensate for light induced current in an unpackaged integrated circuit, the bias circuit comprising:

a first circuit comprising:

a first transistor having a first current electrode coupled to a power supply voltage, and a second current electrode and a control electrode coupled together;

a second transistor having a first current electrode coupled to a power supply voltage, a second current electrode, and a control electrode coupled to both the control electrode and the second current electrode of the first transistor, and a second current electrode; and a third transistor having a first current electrode coupled to the second current electrode of the first transistor, a control electrode, and a second current electrode;

a fourth transistor having a first current electrode and a control electrode coupled to both the second current electrode of the second transistor and to the control electrode of the third transistor, and a second current electrode coupled to a ground terminal;

a light sensitive component having a first terminal coupled to the second current electrode of the third transistor, and a second terminal coupled to ground;

a compensation circuit comprising:

a fifth transistor having a first current electrode coupled to the power supply voltage, a control electrode coupled to the current electrode of the first transistor, and a second current electrode;

a sixth transistor having a first current electrode coupled to the power supply voltage, and a second current electrode and a control electrode coupled together;

a seventh transistor having a first current electrode and a control electrode coupled to the second current electrode of the fifth transistor, and a second current electrode coupled to the ground; and an eighth transistor having a first current electrode coupled to the second current electrode of the sixth transistor, a control electrode coupled to the second current electrode of the fifth transistor, and a second current electrode coupled to the ground terminal; and a second light sensitive component having first and second terminals both coupled to the second current electrode of the fifth transistor.

15. The bias circuit of claim 14, wherein the first and second light sensitive components each comprise an N-well resistor.

16. The bias circuit of claim 15, wherein the N-well resistors of the first and second light sensitive components are formed in a P-substrate, and wherein the P-substrate is grounded.

17. The bias circuit of claim 16, wherein one or both of an area and resistance value of the second light sensitive component is proportional to one or both an area and resistance value of the first light sensitive component.

18. The bias circuit of claim 14, wherein the first circuit is implemented in an unpackaged integrated circuit of a radio frequency identification tag.

* * * * *